(12) United States Patent
Schmuelling et al.

(10) Patent No.: US 6,603,758 B1
(45) Date of Patent: Aug. 5, 2003

(54) SYSTEM FOR SUPPORTING MULTIPLE INTERNET SERVICE PROVIDERS ON A SINGLE NETWORK

(75) Inventors: Guenther Schmuelling, San Jose, CA (US); Stephan Bartlett Sears, Jr., Campbell, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/411,012

(22) Filed: Oct. 1, 1999

(51) Int. Cl.[7] .............................................. H04L 12/66
(52) U.S. Cl. ........................ 370/352; 370/351; 370/401; 709/225; 709/226; 709/227; 709/228; 713/156; 713/157; 713/172; 713/175; 713/161; 713/176; 713/201; 713/202
(58) Field of Search ................................. 370/352, 353, 370/354–356, 401, 227, 244, 351; 713/201, 202, 200, 156, 157; 709/227, 228, 229, 225, 226, 249, 217, 239; 703/172, 175, 161, 176

(56) References Cited

U.S. PATENT DOCUMENTS

| | | | | |
|---|---|---|---|---|
| 6,018,767 A | * | 1/2000 | Fijolek et al. ............... | 709/218 |
| 6,023,698 A | * | 2/2000 | Lavey, Jr. et al. ........... | 707/10 |
| 6,108,789 A | * | 8/2000 | Dancs et al. ................ | 713/201 |
| 6,112,305 A | * | 8/2000 | Dancs et al. ................ | 713/156 |
| 6,141,752 A | * | 10/2000 | Dancs et al. ................ | 713/172 |
| 6,170,061 B1 | * | 1/2001 | Beser ......................... | 713/201 |
| 6,301,223 B1 | * | 10/2001 | Hrastar et al. ............... | 370/227 |
| 6,351,773 B1 | * | 2/2002 | Fijolek et al. ............... | 709/228 |
| 6,385,651 B2 | * | 5/2002 | Dancs et al. ................ | 709/227 |
| 6,412,007 B1 | * | 6/2002 | Bui et al. .................... | 709/227 |
| 6,442,608 B1 | * | 8/2002 | Knight et al. ................ | 709/225 |

OTHER PUBLICATIONS

"Cable Modem Infrastructure Guide, Microsoft® TV Server 1.0 Deployment Pre–Release," WebTV Networks, Inc. (Sep. 29, 1999—3pm).
"Cable Modem Termination System—Network Side Interface Specification," SP–CMTS–NSII01–960702 (Jul. 2, 1996).
"Cable Modem to Customer Premise Equipment Interface Specification," SP–CMCI–I02–980317 (Mar. 17, 1998).
Request For Comments (FCR) 1350, "The TFTP Protocol (Revision 2)," K. Sollins (Jul. 1992).
Request For Comments (RFC) 868, "Time Protocol," J. Postel and K. Harrenstien (May 1983).
Request For Comments (FCR) 2131, "Dynamic Host Configuration Protocol," R. Droms (Mar. 1997).

* cited by examiner

Primary Examiner—Wellington Chin
Assistant Examiner—Chuong Ho
(74) Attorney, Agent, or Firm—Workman, Nydegger & Seeley

(57) ABSTRACT

Described are methods and apparatus that allow cable customers who wish to add a cable modem (or other device) to a local network to choose both the cable modem through which they access the Internet and the Internet Service Provider (ISP) that will provide them that access. A system of hardware connects the local network to the Internet. This hardware includes cable-modem infrastructure that denies Internet access to devices on the local network that are not registered with an authorized ISP. The hardware also facilitates the registration process, allowing devices new to the local network to establish Internet-access agreements with ISPs, and thereby gain access to the Internet.

47 Claims, 5 Drawing Sheets

SYSTEM FOR SUPPORTING MULTIPLE INTERNET SERVICE PROVIDERS ON A SINGLE NETWORK

TECHNICAL FIELD

The invention relates to network-device registration systems that allow devices on a local network, such as a cable network, to register with Internet service providers to obtain access to the Internet.

BACKGROUND OF THE INVENTION

Cable modems handle incoming and outgoing data signals between a cable provider and a personal or business computer or television set. Cable modems are quickly replacing telephone modems in many areas because of the cable modem's superior bandwidth.

DOCSIS (Data Over Cable Systems Interface Specifications) is an industry standard that specifies an interface for cable modems. More specifically, DOCSIS specifies modulation schemes and protocols for exchanging bi-directional signals between devices on a cable network and devices on a TCP/IP network, typically the Internet.

DOCSIS describes a method by which a cable modem can receive an IP address to gain connectivity to the Internet. This method is sufficient for the simple case where the cable provider supplies cable modems to cable customers, who then access the Internet through an Internet Service Provider (ISP) specified by the cable provider. However, there is no provision for cable customers to receive IP addresses for cable modems that are not supplied by their cable provider. Moreover, there is no provision for allowing cable customers to select from among several ISPs on a single cable network. There is therefore a need for a system that allows cable customers to choose both the cable modem through which they access the Internet and the ISP that will provide them that access.

SUMMARY OF THE INVENTION

The present invention is directed to methods and apparatus that let cable customers who wish to add a cable modem (or other device) to a local cable network choose both the cable modem through which they access the Internet and the ISP that will provide them that access.

A system of hardware configured in accordance with one embodiment of the invention connects the local network to the Internet. This hardware includes cable-modem infrastructure (CMI) that denies Internet access to devices on the local network that are not registered with an ISP authorized by the cable company. The hardware also facilitates the registration process, allowing devices new to the local network to establish Internet-access agreements with ISPs, and thereby gain access to the Internet.

Every network device, including cable modems, has a unique identification code called a media-access control (MAC) address. New devices connected to the local network send their MAC address out onto the local network in an effort to obtain a routable IP address (i.e., an IP address that can be used to gain access to the Internet). The CMI intercepts such requests and looks in a MAC database to determine whether the device associated with the MAC address is registered with an ISP, and is therefore entitled to a routable IP address. If the MAC address is not listed, the CMI assigns the modem a non-routable address that can be used on the local network, but cannot be used to gain access to the Internet. The unregistered device can then use the non-routable address to communicate with a registration server in the CMI. The registration server is adapted to facilitate communication between the device and a selected ISP.

Using the non-routable IP address and the registration server, a user of the network device enters into an agreement with a selected ISP. The selected ISP sends a message to the CMI identifying the device, the ISP, and the existence of the service agreement. The CMI then modifies the MAC database to indicate that the device is now registered. The CMI responds to subsequent address requests from the now-registered device with a routable IP address.

Other features of the present invention will be apparent from the accompanying drawings and from the detailed description that follows.

DETAILED DESCRIPTION OF THE INVENTION

Figure 1:
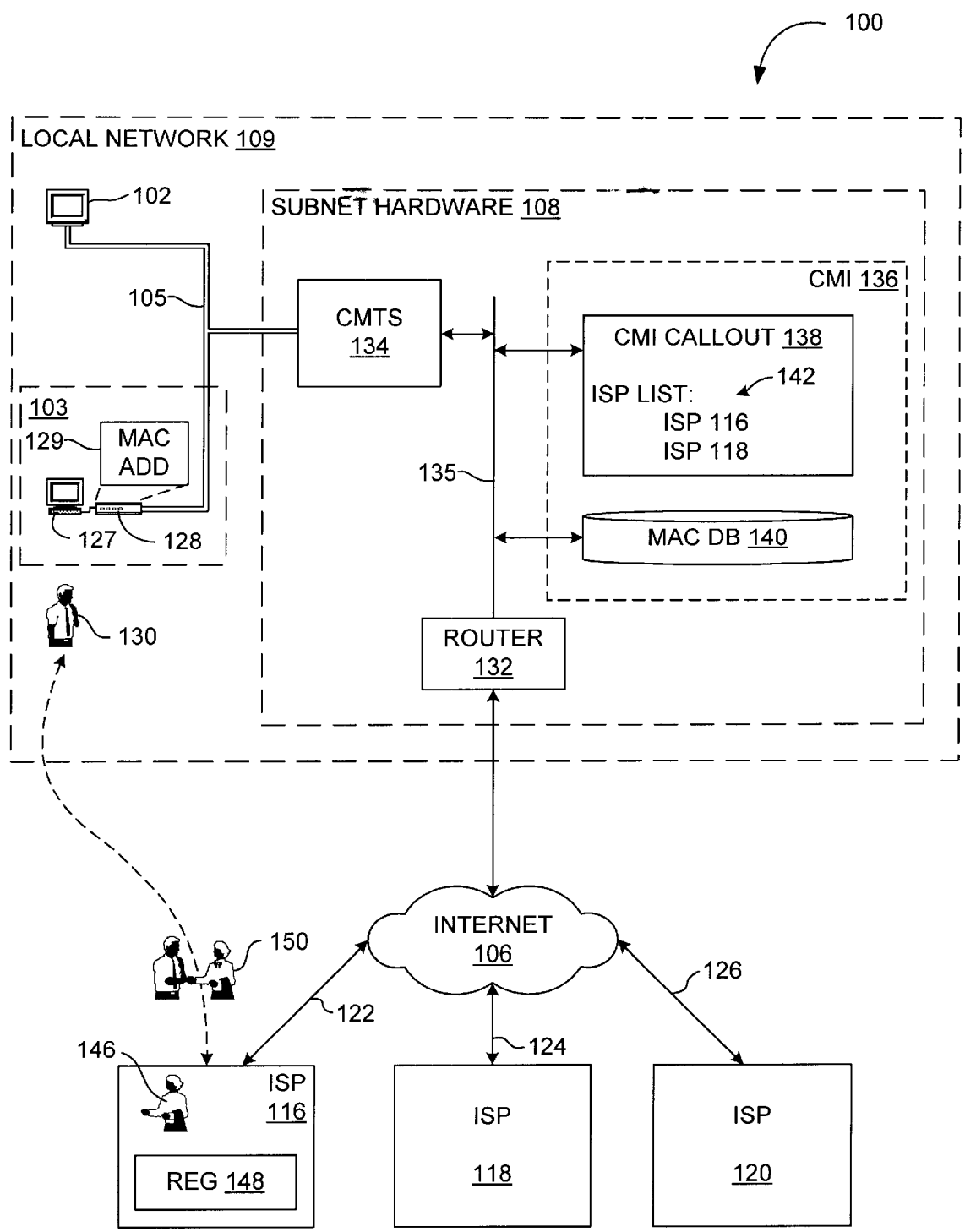
FIG. 1 depicts a system 100 configured in accordance with the invention to facilitate communication between each of a pair of clients 102 and 103 on a cable subnet 105 and information resources available on the Internet 106.

FIG. 1 depicts a system 100 configured in accordance with the invention to facilitate bi-directional communication between each of a pair of clients 102 and 103 on a cable subnet 105 and resources available on the Internet 106 (or some other network or collection of networks).

Cable subnet 105 connects to the Internet 106 via subnet hardware 108. In accordance with the invention, subnet hardware 108 enables clients 102 and 103 to register for Internet service with one of a number of,Internet service providers (ISPs) 116, 118, and 120. ISPs 116, 118, and 120 connect to the Internet 106 via respective connections 122, 124, and 126. Cable subnet 105 and subnet hardware 108 collectively form a local network 109 through which clients 102 and 103 can access the Internet 106.

Client 102 is a set-top box equipped with an internal cable modem; client 103 includes a personal computer 127 connected to cable subnet 105 using an external cable modem 128. Each of clients 102 and 103 conventionally contains a unique media-access control (MAC) address, though only MAC address 129 for client 103 is shown. A computer user 130 is responsible for contracting with an ISP to receive Internet access via client 103.

Subnet hardware 108 includes a conventional router 132 connected to a conventional Cable Modem Termination System (CMTS) 134 via a TCP/IP subnet 135. A detailed discussion of CMTS 134, sometime referred to as a cable network "headend," is beyond the scope of the present disclosure. It is enough to note that CMTS 134 facilitates bi-directional information transfer between cable 105 and a TCP/IP network, such as the Internet 106. For a detailed discussion of CMTS 134, see the document entitled "Cable Modem Termination System-Network Side Interface Specification," SP-CMTS-NSII01-960702 (1996), which is incorporated herein by reference. In accordance with the invention, subnet hardware 108 additionally includes cable-modem infrastructure (CMI) 136 connected to both CMTS 134 and router 132 via subnet 135. CMI 136, in turn, includes a MAC database 140, listing which clients on local network 102 are registered with an ISP, and a CMI callout 138 that bars unregistered devices from accessing the Internet and that allows unregistered devices to register for Internet service with authorized ISPs. Authorized ISPs are listed in CMI callout 138 as ISP list 142.

In the present example, ISP list 142 lists only ISP 116 and 118. The remaining ISP 120 is not authorized to provide service to clients on cable subnet 105, perhaps because the administrator of ISP 120 has not contracted with the administrator of local network 109 to provide service to clients on local network 109.

The dashed line delineating the boundary of local network 109 includes clients 102 and 103 and subnet hardware 108. Strictly speaking, however, local network 109 only includes cable subnet 105, CMTS 134, and TCP/IP subnet 135. Router 132 defines the boundary between local network 109 and the Internet 106.

ISP 116 includes an administrator 146 and an ISP registry 148. Administrator 146 can be either human or an automated user interface with which user 130 can establish an Internet-service agreement 150, illustrated as a "handshake" between administrator 146 and user 130. ISPs 118 and 120 may have administrators and registration databases similar to those of ISP 116.

Figure 2:
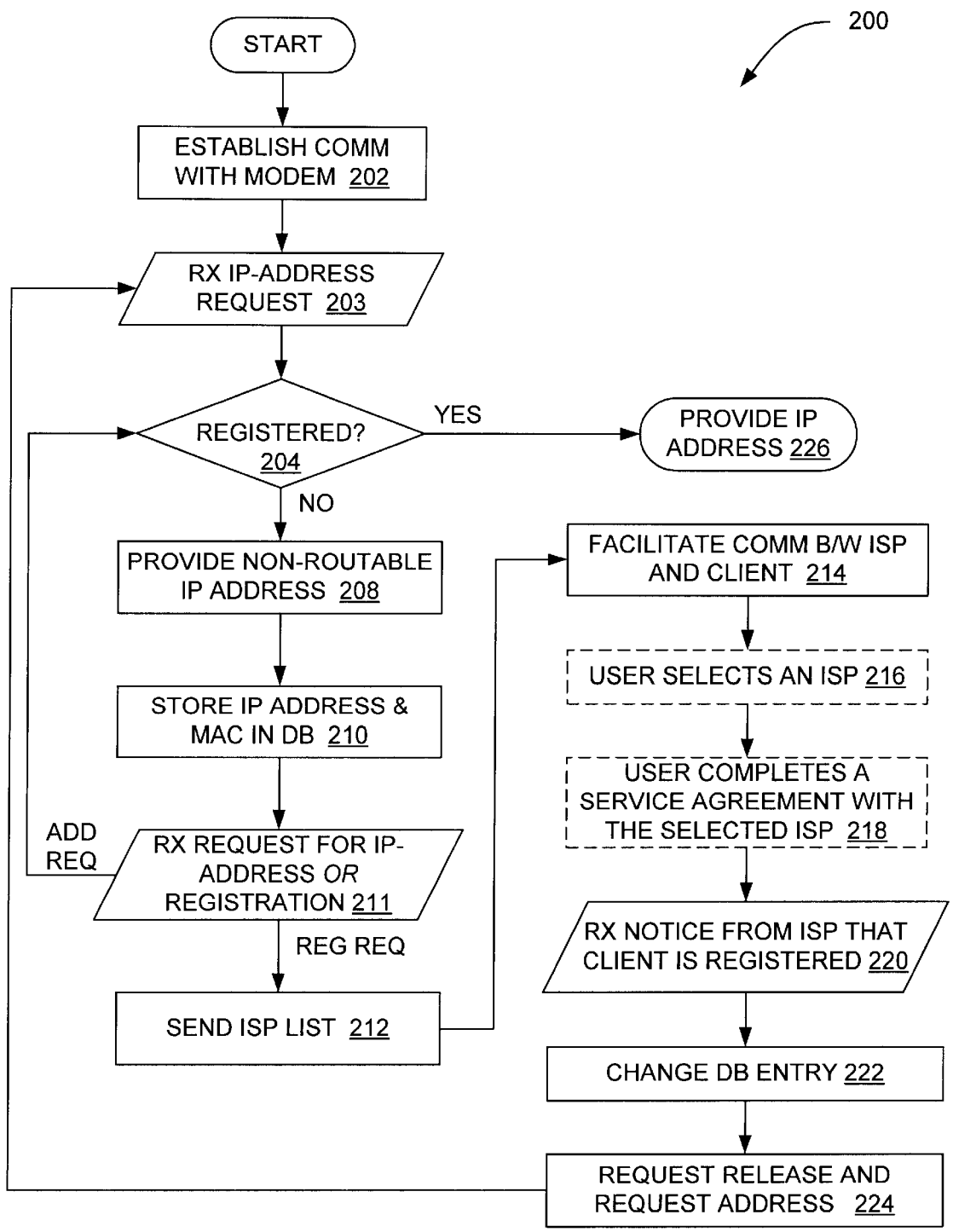
FIG. 2 is a flowchart 200 depicting a process of initiating a service agreement between a prospective Internet user and an Internet service provider.

FIG. 2 is a flowchart 200 depicting a process of initiating service agreement 150 of FIG. 1 between user 130 and administrator 146 of ISP 116, also of FIG. 1. Such an agreement typically affords user 130 access to Internet resources via client 103. (Incidentally, the first digit of each reference number in this document corresponds to the number of the figure in which the identified element was first introduced.)

Beginning at step 202, modem 128 and CMTS 134 employ conventional protocols to communicate over cable subnet 105. CMTS 134 converts between RF signals on cable subnet 105 and digital signals that can be understood by devices on subnet 135. Having established communication with subnet 135, modem 128 transmits a message that includes MAC address 129. CMI callout 138 intercepts this message and determines whether modem 128 is registered with an ISP, and therefore has access to the Internet 106. CMI callout 138 makes this determination by looking to MAC database 140 for an entry identifying MAC address 129 (decision 204). If the answer is yes, then CMI 136 provides modem 128 with an IP address selected from a pool of ISP addresses stored within CMI callout 138.

If MAC 129 is not registered, then CMI callout 138 provides modem 128 with a non-routable IP address (step 208). The non-routable IP address allows modem 128 to communicate with resources on subnet 135; however, router 132 blocks modem 128 from communicating over the Internet 106. CMI callout 138 then stores MAC address 129 and the corresponding non-routable IP address in database 140 (step 210).

CMI server will receive one of two requests from client 103, depending upon whether additional devices within client 103 require an IP address. Computer 127 is a network device, and therefore requires its own IP address. Computer 127 typically transmits an address request a number of times before CMI 136 provides modem 128 with an IP address, thereby enabling modem 128 to communicate requests from computer 127. Upon receiving an address request from computer 127 (step 211), the process returns to decision 204. Computer 127 will then go through steps 208 and 210 as described above for modem 128.

Once modem 128 and 127 have been through steps 208 and 210, both devices have non-routable IP addresses that can be used to communicate with entities on local network 109. User 130 then begins the registration process by starting the browser on computer 127 and directing the browser to connect to a login page stored in CMI 136. This connection initiates a registration request to CMI 136 (step 211). The address of the login page might be provided to user 130 in the installation instructions for modem 128 or by the company that controls local network 109. In another embodiment, the browser of computer 127 is factory configured to automatically connect to the appropriate login page when started.

CMI 136 responds to the registration request of step 211 by sending ISP list 142 to client 103 (step 212) and facilitating communication between client 103 and a selected ISP (step 214). CMI 136 thus enables user 130 to register client 103 with an ISP on the Internet 106 without requiring client 103 have a routable IP address.

The next two steps 216 and 218 are set out with dashed lines to emphasize that they are not separate steps performed by CMI 136, but are instead accomplished between user 130 and administrator 146 of ISP 116 during step 214. User 130 selects an ISP from ISP list 142 (step 216) and completes an Internet-service agreement with the administrator of the selected ISP (step 218). For illustrative purposes, user 130 is assumed to have selected ISP 116 and entered into agreement 150 with administrator 146.

Once user 130 and administrator 146 finalize agreement 150, then administrator 146 notes the agreement in registry 148 and notifies CMI 136 that computer.127 is registered. Upon receipt of this notice (step 220), CMI callout 138 modifies the entry in database 140 corresponding to the MAC address of computer 127 (step 222) to indicate that computer 127 is registered with the selected ISP. CMI 136 also requests that computer 127 release its non-routable IP address and request a new one (step 224). Computer 127 complies with these requests, returning the process to step 203. With computer 127 registered, subsequent requests from computer 127 for IP addresses pass through decision 204 to step 226, in which computer 127 receives a routable IP address.

In the embodiment of FIG. 2, modem 128 does not communicate with devices outside of local network 109, and consequently need not register with an ISP to receive a routable IP address. In other embodiments, modem 128 registers to receive a routable IP address and then uses that address to provide Internet access to any number of devices, such as collection of computers like computer 127. In that embodiment, modem 128 acts as a DHCP server that provides local IP addresses for each of the computers. Modem 128 then translates these local IP addresses to the routable IP address assigned to modem 128 during the registration process. Thus, from the perspective of devices outside of client 103, modem 128 and the associated collection of computers appear as a single device with a single MAC address and a single IP address.

In another embodiment, CMI callout 138 communicates with CMTS 134 to receive a service-flow identifier (SFID) associated with modem 128. All devices behind modem 128 (e.g., computer 127) then automatically use the same SFID as modem 128. When CMI callout 138 receives a new DHCP request, callout 138 requests the SFID associated with the requesting device from CMTS 134; if that SFID matches one for a registered modem, then CMI callout 138 provides a routable IP address. Otherwise, the requesting device is directed through the registration process discussed above. Thereafter, modem 128 will be marked in database 140 as registered, which will allow all devices behind the modem to receive routable IP addresses.

Figure 3:
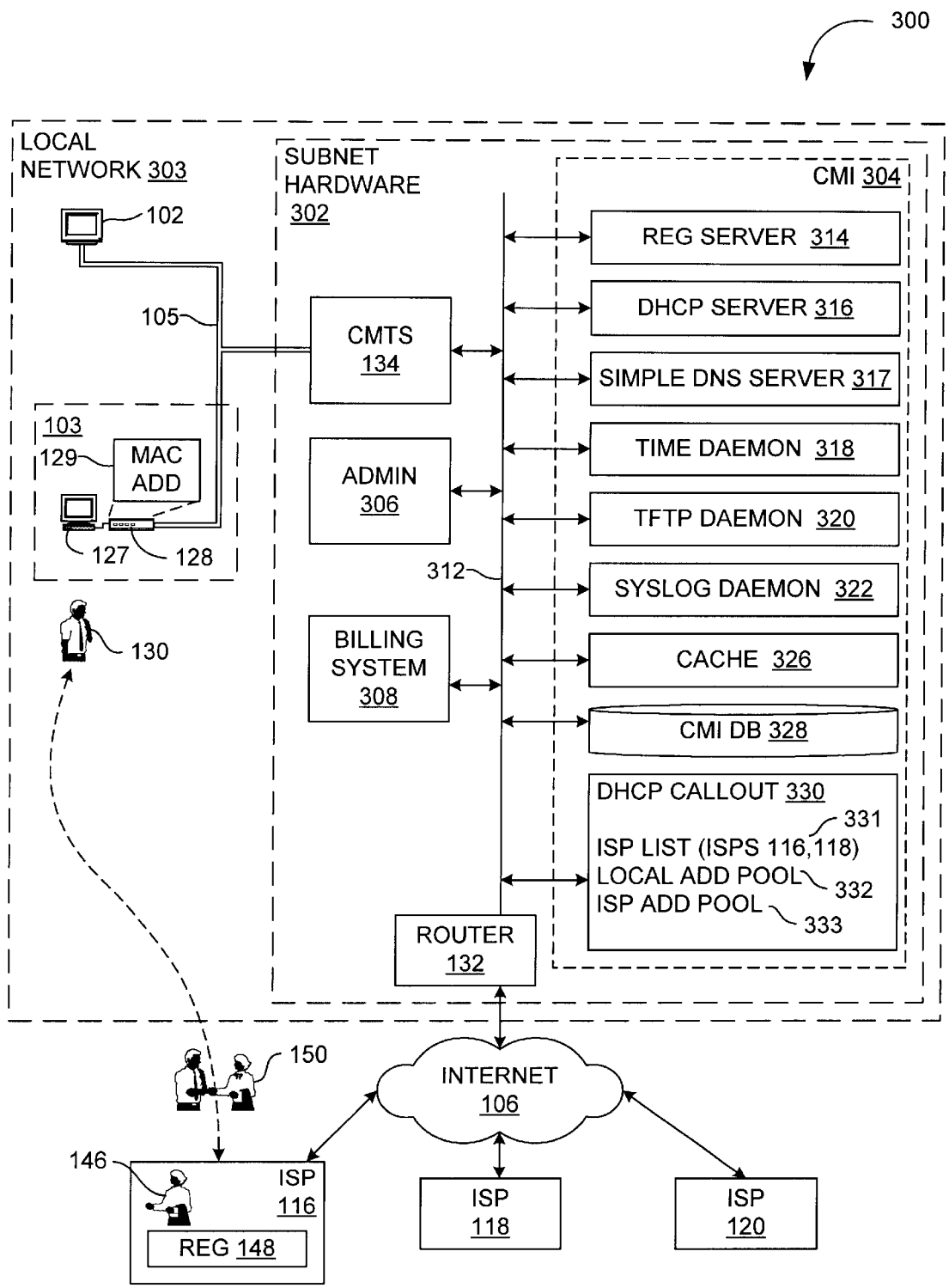
FIG. 3 depicts another system 300 configured in accordance with the invention to facilitate bi-directional communication between clients 102 and 103 and information resources available on the Internet 106.

FIG. 3 depicts a system 300 configured in accordance with the invention. Various elements of FIG. 3 were described above in connection with FIG. 1, like-numbered elements being similar. For example, cable subnet 105, the Internet 106, and each component connected directly to cable subnet 105 and the Internet 106, are identical to the like-numbered elements of FIG. 1.

In system 300, subnet hardware 302 facilitates communication between devices on cable subnet 105 and devices on the Internet 106. Subnet hardware 302 includes the same conventional router 132 and CMTS 134 described in connection with FIG. 1. Subnet hardware 302 and cable subnet 105 are parts of a local network 303 controlled by e.g. a local cable company. Router 132 defines the boundary between local network 303 and the Internet 106.

Subnet hardware 302 includes cable-modem infrastructure (CMI) 304, a network administration interface 306, and a billing system 308, all interconnected by a TCP/IP subnet 312. CMI 304 includes a registration server 314, a DHCP server 316, a simple DNS server 317, a TIME daemon 318, a TFTP daemon 320, a SYSLOG daemon 322, a cache 326, a CMI database 328, and a DHCP callout 330.

DHCP stands for "Dynamic Host Configuration Protocol." DHCP server 316 passes configuration data and reusable network addresses to clients 102 and 103. DHCP server 316 uses a standard protocol specified in Request for Comment (RFC) 2131, entitled "Dynamic Host Configuration Protocol," by R. Droms (March 1997), which is incorporated herein by reference.

DCHP callout 330 is an Application Program Interface (API) that intercepts address requests from clients 102 and 103 directed to DHCP server 316, and intercepts responses from DHCP server 316 directed to clients 102 and 103. DHCP callout 330 caches messages from clients 102 and 103 in cache 326 to avoid unnecessary database lookups in response to redundant client requests. DHCP callout 330 includes a list 331 of ISPs with which clients on local network 303 may enter into a service agreement. Callout 330 bars unregistered devices from accessing the Internet and allow unregistered devices to register for Internet service. In the present example, DHCP callout 330 lists only ISPs 116 and 118. DHCP callout 330 additionally includes a local address pool 332 of non-routable IP addresses and an IP address pool 333 with IP addresses for use with each listed ISP. DCHP callout 330 is described below in more detail in connection with FIG. 4.

"TIME" daemon 318 provides the time and date to network clients so that cable modems do not require battery operated clocks. "Daemon" is a conventional term used to describe a program that is activated, when needed, without user intervention. TIME daemon 318 uses a standard protocol specified in RFC 868, entitled "Time Protocol," by J. Postel and K. Harrenstien (May 1983), which is incorporated herein by reference.

"TFTP" stands for "Trivial File Transfer Protocol." TFTP daemon 320 implements a simple file-transfer service that CMI 304 uses to provide configuration files to clients 102 and 103. TFTP daemon 320 uses a standard protocol specified in RFC 1350, entitled "The TFTP Protocol (Revision 2)" by K. Sollins (July 1992), which is incorporated herein by reference.

SYSLOG daemon 322 provides a standard Application Program Interface (API) that allows clients 102 and 103 to log errors in a single location. For example, once modem 128 receives an IP address, modem 128 will send error messages over local network 303 to SYSLOG daemon 322 for logging. This allows administrator 306 to check for error messages in a single location.

CMI database 328 defines a number of fields that correlate MAC addresses from network clients with information specific to each client. For example, CMI database 328 lists, for each registered client, the type of modem, the ISP with which the client is registered, and the client's billing status. A specific embodiment of database 328 is detailed in "Cable Modem Infrastructure Guide, Microsoft® TV Server 1.0 Deployment Pre-Release," from WebTV Networks, Inc. (Sep. 29, 1999—3 pm), which is incorporated herein by reference.

Figure 4:
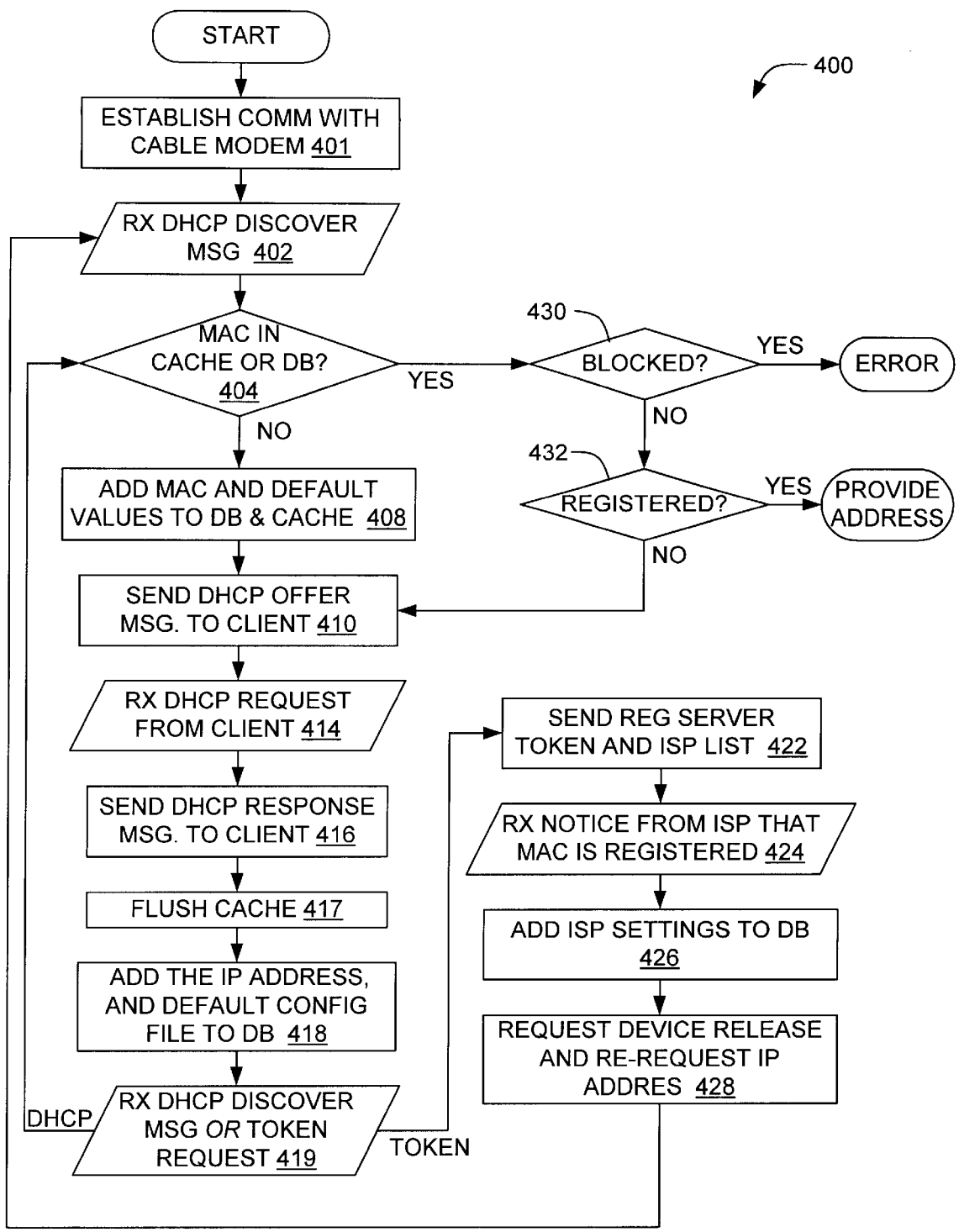
FIG. 4 is a flowchart 400 depicting a process of initiating a service agreement between a prospective Internet user and an Internet service provider.

FIG. 4 is a flowchart 400 depicting a process of initiating service agreement 150 (FIGS. 1 and 3) between user 130 and administrator 146 of ISP 116. Beginning at step 401, modem 128 and CMTS 134 establish communication between subnet 105 and TCP/IP subnet 312. Modem 128 then transmits a DHCP discover message asking for DHCP servers on local network 303. DHCP callout 330 receives and intercepts the discover message (step 402), which includes MAC address 129, and checks to see whether MAC address 129 is listed in database 328 (decision 404).

Assuming that modem 128 is new to local network 303—and therefore that MAC address 129 is not listed in database 328—DHCP callout 330 adds MAC address 129 and some default modem settings to both database 328 and cache 326 (step 408). Caching MAC 129 and the default settings speeds step 404 in the event that CMI 304 receives more than one discover message from modem 128. Such a repeat message might occur during high load situations or when a malicious user attempts to disrupt local network 303 by sending a stream of repeat messages.

DHCP server 316 responds to the DHCP discover message with a DHCP offer message (step 410) that includes an available non-routable IP address from local address pool 332 and conventional configuration parameters for use by modem 128. Modem 128 responds to the DHCP offer message by broadcasting a DHCP request message addressed to DHCP server 316. DHCP server 316 then receives the request message (step 414) and returns a DCHP response message to modem 128 (step 416). The DCHP response message provides modem 128 with configuration parameters, including a committed non-routable IP address from local address pool 332 and the IP addresses of devices on local network 303 with which modem 128 may have to communicate. Such devices include simple DNS server 317, time daemon 318, tftp daemon 320, and syslog daemon 322. Once modem 128 receives these parameters, modem 128 accesses the addressed devices to obtain configuration information and, in the case of syslog daemon 322, to report any errors. This completes the boot process of modem 128, leaving modem 128 able to communicate information to and from computer 127. CMI callout 138 then flushes cache 326 (step 417) and stores the assigned IP address and default configuration data in database 328 (step 418) with MAC address 129.

A device behind cable modem 128 may require an additional IP address. In the present example, computer 127 needs an IP address and will therefore issue a DHCP discover request. Computer 127 may issue this request a number of times before modem 128 receives an IP address enabling modem 128 to convey the request from computer 127. Upon receiving DHCP discover message from computer 127 (step 419), the process returns to decision 404.

In the example, computer 127 is not registered. Thus, the MAC address of computer 127 is not listed in cache 326 or database 328. Consequently, computer 127 proceeds from step 408 through step 418 in the same manner that modem 128 traversed those steps. Thus, the second time the process arrives at step 419, both modem 128 and computer 127 are listed in database 328.

At this point, both modem 128 and computer 127 have non-routable IP addresses that can be used to communicate with entities on local network 303. Further, computer 127 has been provided with the addressing information required for computer 127 to communicate with various elements of CMI 304, including registration server 314.

User 130 begins the registration process by starting the browser on computer 127 and, if the browser is not configured to do so automatically, directing the browser to connect to a login page, http://loqin, in one embodiment. Earlier (step 416), the DHCP response message set the DNS server entry in computer 127 to simple DNS 317. The hostname "login" on simple DNS server 317 points to the self-registration page on registration server 314. Thus, when user 130 starts the browser on the unregistered client 103, the browser automatically connects to the self-registration page. When the browser connects, registration server 314 requests a token and ISP list 331 from DHCP callout 330. The token is a key given to client 103 to present to an ISP when registering with the ISP. The ISP will have to present the token back to CMI 304 to authenticate that client 103 registered with the ISP. The use of a token thus ensures that user 130 entered into a service agreement with the ISP. In one embodiment, the token is a 64-bit random number.

From step 419, callout 330 presents the requested token and ISP list 331 to registration server 314 and stores the token in database 328 with the MAC address of computer 127 (step 422). Registration server 314 then forwards the token and ISP list 131 to computer 127 and prompts user,130 to select from among the listed ISPs. Upon selecting an ISP, user 130 is presented with the registration page of the selected ISP (e.g., a page in registry 148 of ISP 116) by way of registration server 314. In effect, registration server 314 acts as a TCP/IP proxy and routes data between client 103 and ISP 116.

Registry 148 prompts user 130 for registration data and requests a list of available IP and service classes from CMI 304. Registry 148 then presents the available IP and service classes to user 130, who then selects a service class from the list. IP classes are used when a single ISP has multiple pools of IP addresses. Addresses from different pools may be routed differently, through better network connections, for example. Service classes specify what level of service a user receives within a given pool of IP addresses. For example, a particular user may receive higher priority than others in the same IP class.

Once user 130 and administrator 146 finalize agreement 150, administrator 146 adds the MAC address for computer 127 to ISP registry 148 and notifies CMI 136 that computer 127 is registered. The notice from ISP registry 148 includes the token and various required ISP settings. Callout 138 receives this message and, if the token is the same one originally supplied to computer 127, modifies the entry in database 328 corresponding to computer 127 (step 426) to include the ISP settings and to indicate that computer 127 is registered with the selected ISP.

Upon completion of the registration process, callout 330 requests that computer 127 release and re-request its IP address (step 428). Computer 127 thus releases its non-routable IP address and transmits a new DHCP discover message. Callout 330 receives the DHCP request (step 203) and again examines the MAC entry of computer 127 to determine whether computer 127 is listed in database 328. Because computer 127 was so listed in step 408, the process moves to step 430 in which callout 330 determines whether computer 127 is listed in database 328 as "blocked"

A particular client or device may be listed as "blocked" for many reasons. For example, an administrator in the local cable company controlling local network 303 might block access from a device found to be distributing illegal or offensive content, or a member of the cable company's billing department might block access to cable subscribers who are unwilling to pay for the service. Administration interface 306 and billing-system interface 308 are Component Object Model (COM) interfaces that afford cable-company employees access to database 328 for these and other purposes.

If computer 127 is not blocked, CMI callout 330 examines a second field in database 328 corresponding to the respective MAC address, this time to determine whether computer 127 is registered with an ISP (decision 432). In the example, computer 127 is registered with ISP 116, so callout 330 issues computer 127 a routable IP address from address pool 333. Had computer 127 not been registered, then the process flow would move to step 410 and would continue as described above. A client might be listed in database 328 but not registered if, for example, the user did not complete a registration process. Alternatively, a user or an ISP might send a message to registration server 314 indicating the cessation of a registration agreement between the user and the ISP. Registration server 314 could then mark the user's client as unregistered without removing the associated MAC address from database 328.

Figure 5:
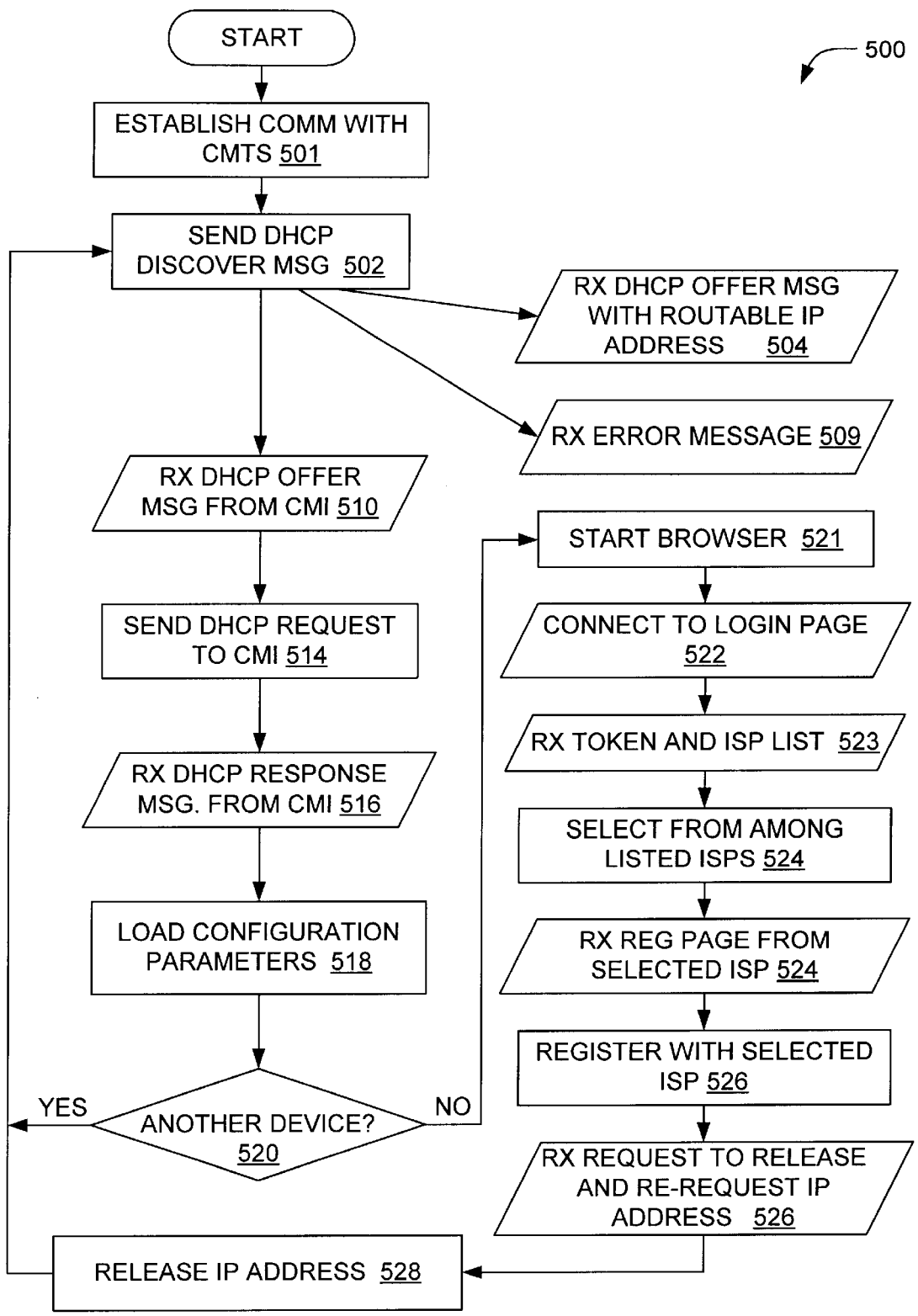
FIG. 5 is a flowchart 500 depicting the process of FIG. 4 from the perspective of a client controlled by the prospective user.

FIG. 5 is a flowchart 500 depicting the process of initiating service agreement 150 between user 130 and administrator 146 of ISP 116 from the perspective of client 103. Beginning at step 501, modem 128 and CMTS 134 communicate over cable subnet 105 to establish a connection between cable subnet 105 and TCP/IP subnet 312. Modem 128 then transmits a DHCP discover message (step 502) asking for DHCP servers on local network 303. Modem 128 can expect one of three responses:

1. if modem 128 is registered with an ISP, then modem 128 will receive a DHCP offer message containing a fully routable IP address (step 504) from address pool 333;
2. if CMI 304 lists modem 128 as a blocked device, then modem 128 will receive an error message 509 from CMI 304; and
3. if modem 128 is not registered with an ISP, then modem 128 will receive a DHCP offer message (step 510) from CMI 304 containing a non-routable IP address.

The offer message of step 510 includes a non-routable IP address from local address pool 332 and some configuration parameters for modem 128. Modem 128 responds to the offer message by sending a DHCP request message (step 514) addressed to DHCP server 316. DHCP server 316 of CMI 304 returns a DCHP response message to modem 128 (step 516). As mention above in connection with FIG. 4, the DCHP response message provides modem 128 with configuration parameters, including a committed non-routable IP address and the IP addresses of devices on local network 303 with which modem 128 may have to communicate. Modem 128 then contacts various resources on local network 303 using the configuration parameters (step 518). These resources include time, tftp, and syslog daemons 318, 320, and 322. During this process, modem 128 contacts:

1. time daemon 318 to get the time;
2. tftp daemon 320 to get a modem configuration file;
3. syslog daemon 322, as necessary, to report any errors; and
4. simple DNS server 317 to get the address of registration server 314, which contains the self-registration page.

What client 103 does after step 518 depends on whether there are additional devices within client 103 that need IP 19 addresses.

If another device, such as computer 127, requires an IP address, then that other device will send its own DHCP discover message (decision 520) and traverse flowchart 500 in the manner described above for modem 128. Assuming that computer 127 requires an IP address, the process proceeds once again through the steps on the left-hand side of flowchart 500 to step 518. Both modem 128 and computer 127 then have non-routable IP addresses that can be used to communicate with entities on local network 303. Once each device within client 103 has a non-routable IP address, the registration process begins when user 130 starts the browser on computer 127 (step 521).

The browser connects to its login page, http://login, either automatically or as directed by user 130 (step 522). Registration server 314 then requests and receives a token and ISP list 331 from DHCP callout 330. Registration server 314 then sends the token and list to computer 127. Having received the token and ISP list 331 (step 523), user 130 selects from among the listed ISPs (step 524). Registration server 314 facilitates communication between client 103 and the selected ISP so that user 130 can register computer 127 with the selected ISP.

Once registered, computer 127 receives a request from CMI 304 instructing computer 127 to release the assigned IP address and request another (step 526). Computer 127 then releases its non-routable IP address (step 528) and acquires a new IP address by issuing a new DHCP discover message (returning to step 502). Because computer 127 is now registered, CMI 304 responds to the DHCP discover message with a routable IP address (step 504) that allows computer 127 to access the Internet 106.

While the present invention has been described in connection with specific embodiments, variations of these embodiments will be apparent. For example, while described in connection with cable-modem networks, the invention is equally applicable to other types of local networks. Therefore, the spirit and scope of the appended claims should not be limited to the foregoing description.

What is claimed is:

1. In a communication infrastructure contained in a second network, a method for initiating a service agreement between a user of a network device that is network connectable to a first network and one of a plurality of service providers having corresponding servers that are network connectable to the second network, wherein the network device includes an identification code unique to the first network, the method comprising:

a. receiving the code from the network device;
    b. in response to receiving the code, transmitting u message to the network device, the message including a list of a plurality of service providers having corresponding servers that are network connectable to the second network by being connected to a third network, which is external to both the first network and the second network, and that can authorize the network device to access the third network;
    c. prompting the user to establish a service agreement by selecting a service provider from among the service providers; and
    d. receiving a notice from the selected service provider, the notice indicating that the selected service provider authorized the network device to access the third network; and
    assigning the network device a global address that can be used to communicate with other components that are network connectable to the first network, the second network, and the third network.

2. A system for establishing communication between a network computer connected to a first network and a remote information store, the system comprising:

a. a plurality of service provider computers connected to a third network, which is external to the first network and a local network, each of the service provider computers adapted to authorize network computers connected to the first network to access the third network;
    b. a server connected to the local network and adapted to:
        i. receive a unique identifier from the network computer and, in response, assign a non-routable address to the network computer, wherein the non-routable address can be used to communicate with components contained in the first network and the local network;
        ii. in response to receiving the unique identifier, transmit a list, which contains a plurality of service providers that arc network connectable to the local network by being connected to the third network and that can authorize communication to the third network that would otherwise be blocked by components of the local network, to the network device; and
        iii. store the unique identifier in a database identifying the network computer as a registered network computer;
    c. an address server connected to the local network and adapted to assign a routable IP address to the registered network computer.

3. In a cable modem infrastructure that is contained in a local network, a method of establishing communication between a network computer that is network connectable to a first network and a remote information store that is network connectable to the local network, the method comprising:

a. receiving a unique identifier from the network computer;
    b. determining, based on the unique identifier from the network computer, that the network computer does not have authority to access a third network, which is external to the first network and the local network; and
    c. in response to the determination that the network computer does not have authority to access the third network,
        i. providing a non-routable address to the network computer, wherein the non-routable address can be used to communicate with components contained in the first network and the local network;

ii. facilitating an agreement between a user of the network computer and one of a plurality of entities authorized to grant network computers access to the third network, wherein each of the entities have corresponding service provider computers that are network connectable to the local network by being connected to the third network; and iii. providing the network computer a routable address that can be used to communicate with components connected to the first network, the local network, and the third network, upon completion of the agreement.

4. A method of establishing communication between a network computer connected to a first network and that is network connectable to a local network and a remote information store, the method comprising:

a. broadcasting a unique identifier;

b. receiving a non-routable address that can be used to communicate with components contained in the first network and the local network;

c. receiving, from a component included in the local network, a list identifying a plurality of service providers that are network connectable to the local network by being connected to a third network, which is external to the first network and the local network, and that can each authorize network computers contained in the first network to send communications to the third network that would otherwise be blocked by components of the local network; and d. selecting one of the plurality of service providers; and receiving a routable address that can be used to communicate with components that are network connectable to the first network, the local network, and tho third network.

5. In a communications infrastructure that is contained in a second network and that is network connectable to a first network, wherein the communications infrastructure can store a list containing a plurality of service providers that can authorize access to networks, wherein a network device that is network connectable to the first network can register with a service provider from among the plurality of service providers, and if authorized by a service provider to access a network, can access the network, and wherein the communications infrastructure can store device identifiers, each device identifier identifying a unique network device, a method for initiating a registration process for a network device so as to provide the network device with access to a network, the method comprising the acts of:

receiving a device identifier from a network device;

in response to receiving the device identifier, transmitting to the network device a list, which contains a plurality of service providers that are network connectable to the second network by being connected to a third network, which is external to the first network and the second network, and that can authorize access to tie third networks;

receiving an indication that a service provider, from among the plurality of service providers, was selected at the network device; and receiving a notice that the selected service provider has authorized the network device to access the third network; and assigning the network device a global address that can be used to communicate with other components that are network connectable to the first network, the second network, and the third network.

6. The method as recited in claim 5, wherein the act of receiving a device identifier from a network device comprises all act of receiving a MAC address.

7. The method as recited in claim 5, wherein the act of receiving a device identifier from a network device comprises an act of receiving a device identifier from a cable modem.

8. The method as recited in claim 5, wherein the act of receiving a device identifier from a network device comprises an act of intercepting a request for an IP address.

9. The method as recited in claim 5, wherein the act of receiving a notice that the selected service provider has authorized the network device to access the third network comprises an act of receiving a notice that the selected service provider has authorized the network device to access the Internet.

10. The method as recited in claim 5, wherein the act of receiving a notice that the selected service provider has authorized the network device to access the third network comprises an act of receiving a token that was previously transferred to the network device along with the list from a registration server.

11. The method as recited in claim 5, further comprising:

an act of routing the received indication from the first network, through a portion of the second network and through a portion of the third network, to the service provider that was selected from among the plurality of service providers.

12. The method as recited hi claim 11, wherein the act of routing the received indication from the first network, through a portion of the second network and through a position of the third network, to the service provider that was selected from among the plurality of service providers comprises the following:

an act of routing the received indication from a cable subnet, through a portion of the second network and through a portion of the Internet, to a service provider computer associated with the service provider that was selected from among the plurality of service providers.

13. The method as recited in claim 5, further comprising:

act of storing at least a portion of the notice.

14. The method as recited in claim 13, wherein the act of storing at least a portion of the notice comprises an act of modifying an entry in a database that corresponds to the received device identifier to indicate that the network device is registered with the selected service provider.

15. The method as recited in claim 5, further comprising:

an act of assigning the network device a local address that can be used to communicate with other components contained in the first network and second network.

16. The method as recited in claim 15, wherein the act of assigning the network device an address that can be used to communicate with other devices contained in the first network and the second network comprises an act of assigning a non-routable IP address to the network device.

17. The method as recited in claim 15, further comprising:

an act of transferring the local address to the network device.

18. The method as recited in claim 5, wherein the act of assigning the network device a global address that can be used to communicate with other components that are network connectable to the first network, the second network, and the third network comprises an act of assigning the network device a routable IP address.

19. The method as recited in claim 5, further comprising:

an act of prompting the user to select one of the service providers contained in the list.

20. The method as recited in claim 5, further comprising:
an act of transmitting a token, which when presented to the selected service provider indicates to the selected service provider that the network device has initiated a registration process, to the network device.

21. The method as recited in claim 5, further comprising;
in response to receiving die notice, enabling the network device to send communications, which would otherwise be blocked by components of the second network, to the third network.

22. In a cable modem infrastructure that is contained in a second network, that is network connectable to a network computer on a first network, and that is network connectable to a plurality of service provider computers, a method for authorizing the network computer to access a network, the method comprising the acts of:
receiving a unique identifier from the network computer;
determining, based on the unique identifier received from the network computer, that the network computer is not authorized to access a third network, which is external to the first network and the second network; and
in response to the determination that the network computer is not authorized to access the third network, registering the network computer with a service provider computer, including:
providing the network computer with a non-routable address that can be used to communicate with components contained in the first network and the second network;
transmitting a list containing a plurality of service providers that are network connectable to the second network by being connected to the third network and can authorize access to the third network;
routing a selection of one of the service providers contained in the list from the first network, across a portion of the second network and across a portion of the third network, to a service provider computer; and
providing the network computer a routable address that can be used to communicate with components that are network connectable to the first network, the second network, and the third network.

23. The method as recited in claim 22, wherein the act of determining, based on the unique identifier received from the network computer, that the network computer is not authorized to access the third network, comprises the following:
an act of determining that the unique identifier received from the network computer is not included in a database of computers that are authorized to access the third network.

24. The method as recited in claim 22, wherein the act of determining, based on the unique identifier received from the network computer, that the network computer is not authorized to access the third network, comprises the following:
an act of determining that the network computer is not registered with any one of a plurality of service providers that can authorize a computer to access the third network.

25. The method as recited in claim 22, wherein the act of providing the network computer with a non-routable address that can be used to communicate with components contained in the first network and the second network comprises the following:
an act of providing the network computer with a non-routable IP address that can be used to communicate with components contained in a cable subnet and the second network.

26. The method as recited in claim 22, wherein the act of providing the network computer a routable address that can be used to communicate with components that are network connectable to the first network, the second network, and the third network comprises tile following:
an act of providing a routable IP address to the network computer that can be used to communicate with components that are network connectable to a cable subnet, the second network, and the Internet.

27. The method as recited in claim 22, further comprising:
an act of receiving a token that indicates the network computer successfully registered with one of the plurality of service providers that can authorize access to the third network.

28. The method as recited in claim 27, further comprising:
an act of storing the token in a database to indicate that the network computer is authorized to access the third network.

29. The method as recited in claim 22, further comprising:
an act of sending a request to the network computer to release the non-routable address.

30. In a network device that is connected to a first network and that is network connectable to a second network, a method for registering the network device to access a network through one of a plurality of service provider computers that can authorize network devices to access networks, the method comprising the acts of:
sending a unique identifier to the second network;
receiving data from a component included in the second network including:
a non-routable address that can be used to communicate with components contained in the first network and the second network; and
a list containing a plurality of service providers that are network connectable to the second network by being connected to a third network, which is external to the first network and the second network, and that can each authorize that can each authorize network computers contained in the first network to send communications to the third network that would otherwise be blocked by components of the second network; and
selecting a service provider form among the plurality of service providers contained in the list; and
receiving a routable address that can be used to communicate with components that are network connectable to the first network, the second network, and the third network.

31. The method as recited in claim 30, wherein sending a unique identifier to the second network comprises the following:
an act of sending a MAC address.

32. The method as recited in claim 30, wherein sending a unique identifier to the second network comprises the following:
an act of a cable modem sending a unique identifier.

33. The method as recited in claim 30, wherein a list containing a plurality of service providers that arc network connectable to the second network by being connected to third network, which is external to the first network and the second network, and that call each authorize network devices contained in the first network to access the third network comprises the following:
a list containing a plurality of service providers that are network connectable to the cable network head end by being connected to a third network, which is external to a cable subnet and a cable network head end, and that can each authorize network devices connected to a cable subnet to access the third network.

34. The method as recited in claim 30, wherein receiving data from a component included in the second network further includes:
an act or receiving a token that can indicate to one of the plurality of service providers that the network device is in the process of registering for access to the third network.

35. The method as recited in claim 30, further comprising:
an act of sending a token, which indicates the network device is in the process of registering for access to the third network, to the selected service provider.

36. The method as recited in claim 30, wherein the act of receiving a routable address that can be used to communicate with components that are network connectable to the first network, the second network, and the third network comprises the following:
an act of receiving a routable IP address that can be used to communicate with components that are network connectable to a cable subnet, the second network, and the Internet.

37. The method as recited in claim 30, further comprising:
an act of, subsequent to selecting a service provider, receiving a request to release the non-routable address.

38. A computer program product for use in a communications infrastructure that is contained in a second network and that is network connectable to a first network and a third network, wherein the communications infrastructure call store a list containing a plurality or service providers that can authorize access to networks, wherein a network device that is network connectable to the first network can register with a service provider from among the plurality of service providers, and if authorized by a service provider to access a network, can access the network, and wherein the communications infrastructure can store device identifiers, each device identifier identifying a unique network device, the computer program product for implementing a method for initiating a registration process for a network device so as to provide the network device with access to a network, the computer program product comprising:
one or more computer-readable media carrying computer-executable instructions, that when executed at the communications infrastructure, cause the communications infrastructure to perform the method, including:
receiving a device identifier from a network device;
in response to receiving the device identifier, transmitting to the network device a list, which contains a plurality of service providers that arc network connectable to the second network by being connected to a third network, which is external to the first network and the second network, and that can authorize access to the third network;
receiving an indication that a service provider, from among the plurality of service providers, was selected at the network device; and
receiving a notice that the selected service provider has authorized the network device to access the third network; and
assigning the network device a global address that can be used to communicate with other components that are network connectable to the first network, the second network, and the third network.

39. The computer program product as recited in claim 38, wherein the one or more computer readable media include physical storage media.

40. A computer program product for use in a network device that is connected to a first network and that is network connectable to a second network, the computer program product for implementing a method for registering the network device to access network through one of a plurality of service provider computers that can authorize network devices to access networks, the computer program product comprising:
one or more computer-readable media carrying computer-executable instructions, that when executed at the network device, cause the network device to perform the method, including:
sending a unique identifier to the second network;
receiving data from a component included in the second network including:
a non-routable address that can be used to communicate with components contained in the first network and the second network; and
a list containing a plurality of service providers that are network connectable to the second network by being connected to a third network, which is external to the first network and the second network, and can each authorize network computers contained in the first network to send communications to the third network that would otherwise be blocked by components of the second network; and
selecting a service provider form among the plurality of service providers contained in the list; and
receiving a routable address that can be used to communicate with components that are network connectable to the list network, the second network, and the third network.

41. The computer program product as recited in claim 40, wherein the one or more computer readable media include physical storage media.

42. In a network environment that includes a plurality of Internet Service Providers and a local network that is capable of connecting to the plurality of Internet Service Providers over the Internet, a method for a local device on the local network to register with one of the Internet Service Providers notwithstanding that that the local device is not previously registered with any Internet Service Provider and is thus not capable of communicating over the Internet to directly register with that Internet Service Provider, the method comprising the following:
an act of receiving a request to access the Internet from the local device over the local network,
an act of determining that the local device has not previously registered with any of the plurality of Internet Service Providers and thus cannot directly access the Internet in response to the request;
an act of transmitting a response to the request in the form of a list of the plurality of Internet Service Providers, the response further causing the local device to prompt the user to select one of the plurality of Internet Service Providers and to establish a service agreement with the selected Internet Service Provider;
an act of receiving a notice from the selected Internet Service Provider that the user has established a service agreement with the selected Internet Service Provider; and
act of receiving a routable address that can be used to communicate with the selected Internet Service provider.

43. A method in accordance with claim 42, further comprising the following:

a step for facilitating communication between the local device and the selected Internet Service Provider to establish the service agreement.

44. A method in accordance with claim 42, wherein the local network comprises a cable subnet, the request including a Media-Access Control (MAC) address.

45. A method in accordance with claim 42, wherein the act of transmitting a response comprises the following:

an act of additionally transmitting a non-routable IP address that allows the local device to communicate with resources on the local network, but not with resources on the Internet.

46. A method in accordance with claim 42, wherein the response causes the local device to prompt the user to select one of the plurality of Internet Service Provider and to establish a service agreement with the selected Internet Service Provider using a login page.

47. A computer program product for use in a network environment that includes a plurality of Internet Service Providers and a local network that is capable of connecting to the plurality of Internet Service Providers over the Internet, the computer program product for implementing a method for a local device on the local network to register with one of the Internet Service Providers notwithstanding that that the local device is not previously registered with any Internet Service Provider and is thus not capable of communicating over the Internet to directly register with that Internet Service Provider, the computer program product comprising one or more computer-readable media having stored thereon computer-executable instructions that, when executed by a processor, cause a server computing system in the local network to perform the following:

an act of detecting receipt of a request to access the Internet from the local device over the local network;

an act of determining that the local device has not previously registered with any of the plurality of Internet Service Providers and thus cannot directly access the Internet in response to the request;

an act of causing a response to the request to be transmitted in the form of a list of the plurality of Internet Service Providers, the response further causing the local device to prompt the user to select one of the plurality of Internet Service Providers and to establish a service agreement with the selected Internet Service Provider;

an act of detecting receipt of a notice from the selected Internet Service Provider that the user has established a service agreement with the selected Internet Service Provider; and an act or detecting receipt of a routable address that can be used to communicate with the selected Internet Service provider.

* * * * *

UNITED STATES PATENT AND TRADEMARK OFFICE
CERTIFICATE OF CORRECTION

PATENT NO.     : 6,603,758 B1
DATED          : August 5, 2003
INVENTOR(S)    : Schmuelling et al.

It is certified that error appears in the above-identified patent and that said Letters Patent is hereby corrected as shown below:

Column 2,
Line 49, after "number" please delete "of,Internet" and insert -- of Internet --.

Column 4,
Line 41, after "that computer" please delete ".".

Column 5,
Line 43, before "callout 330" please delete "DCHP" and insert -- DHCP --.
Line 58, after "ISP." please delete "DCHP" and insert -- DHCP --.

Column 6,
Line 51, after "and returns a" please delete "DCHP" and insert -- DHCP --.
Line 52, after "The" please delete "DCHP" and insert -- DHCP --.

Column 7,
Line 25, after "login page," please delete "http://loqin" and insert -- http://login --.
Line 44, after "prompts user" please delete ",".

Column 9,
Line 1, after "returns a" please delete "DCHP" and insert -- DHCP --.
Line 3, before "response message" please delete "DCHP" and insert -- DHCP --.
Line 18, after "that need IP" please delete "19".

Column 10,
Line 2, after "transmitting" please delete "u" and insert -- a --.
Line 12, after "providers;" please delete "and".
Line 39, after "providers that" please delete "arc" and insert -- are --.

Column 11,
Line 30, after "network;" please remove "and".
Line 34, after "network, and" please remove "tho" and insert -- the --.
Line 56, after "access to" please remove "tie" and insert -- the --.
Line 60, after "device;" please remove "and".

UNITED STATES PATENT AND TRADEMARK OFFICE
CERTIFICATE OF CORRECTION

PATENT NO. : 6,603,758 B1
DATED : August 5, 2003
INVENTOR(S) : Schmuelling et al.

It is certified that error appears in the above-identified patent and that said Letters Patent is hereby corrected as shown below:

<u>Column 12,</u>
Line 29, after "as recited" please remove "hi" and insert -- in --.

<u>Column 13,</u>
Line 7, after "receiving" please remove "die" and insert -- the --.

<u>Column 14,</u>
Line 7, after "comprises" please remove "tile" and insert -- the --.
Line 44, after "network;" please remove "and".
Line 45, after "provider" please delete "form" and insert -- form --.
Line 57, after "cable" please remove "modern" and insert -- modem --.
Line 60, after "that" please remove "arc" and insert -- are --.
Line 63, after "and that" please remove "call" and insert -- can --.

<u>Column 15,</u>
Line 31, after "infrastructure" please remove "call" and insert -- can --.
Line 32, after "plurality" please remove "or" and insert -- of --.
Line 58, after "device;" please remove "and".

<u>Column 16,</u>
Line 27, after "network;" please remove "and".
Line 28, after "provider" please remove "form" and insert -- from --.
Line 42, after "notwithstanding that" please delete the second instance of "that".
Line 65, before "act of" please insert -- an --.

UNITED STATES PATENT AND TRADEMARK OFFICE
CERTIFICATE OF CORRECTION

PATENT NO. : 6,603,758 B1
DATED : August 5, 2003
INVENTOR(S) : Schmuelling et al.

It is certified that error appears in the above-identified patent and that said Letters Patent is hereby corrected as shown below:

Column 17,
Line 17, after "Internet Service" please remove "Provider" and insert -- Providers --.

Signed and Sealed this

Fifteenth Day of June, 2004

JON W. DUDAS
*Acting Director of the United States Patent and Trademark Office*